United States Patent
Yukimasa

(10) Patent No.: US 12,349,178 B2
(45) Date of Patent: Jul. 1, 2025

(54) BASE STATION APPARATUS, TERMINAL APPARATUS, CONTROL METHOD, AND STORAGE MEDIUM

(71) Applicant: CANON KABUSHIKI KAISHA, Tokyo (JP)

(72) Inventor: Koji Yukimasa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 425 days.

(21) Appl. No.: 17/719,738

(22) Filed: Apr. 13, 2022

(65) Prior Publication Data

US 2022/0346100 A1    Oct. 27, 2022

(30) Foreign Application Priority Data

Apr. 23, 2021  (JP) .................. 2021-073656

(51) Int. Cl.
*H04W 72/21* (2023.01)
*H04W 72/0453* (2023.01)
*H04W 72/541* (2023.01)

(52) U.S. Cl.
CPC ..... *H04W 72/541* (2023.01); *H04W 72/0453* (2013.01)

(58) Field of Classification Search
CPC . H04W 72/23; H04W 72/0453; H04W 72/20; H04W 88/08; H04W 72/0446; H04W 72/21; H04W 24/02; H04W 72/27; H04W 74/002; H04W 76/27; H04W 48/12; H04W 84/045; H04W 88/12; H04L 5/0007; H04L 5/0053; H04L 5/0023; H04L 5/0073; H04L 5/001; H04B 7/26
See application file for complete search history.

(56) References Cited

U.S. PATENT DOCUMENTS 9,865,932 B2   1/2018   Yukimasa
10,637,524 B2   4/2020   Yukimasa
(Continued)

FOREIGN PATENT DOCUMENTS

JP    2010-062875 A    3/2010
WO   2019/031212 A1   2/2019

OTHER PUBLICATIONS

Notice of Reasons for Refusal issued by the Japanese Patent Office on Feb. 28, 2025 in corresponding JP Patent Application No. 2021-073656, with English translation.

*Primary Examiner* — Kharye Pope
(74) *Attorney, Agent, or Firm* — Carter, DeLuca & Farrell LLP

(57) ABSTRACT

A base station apparatus of a second network in which communication is performed using time division duplex (TDD) in a frequency band different from a frequency band of a predetermined first network receives, from a terminal apparatus currently connected to the base station apparatus, a first notification indicating whether the terminal apparatus has detected a radio wave of a network different from the second network, and transmits, if it is specified based on the first notification that the terminal apparatus has detected a radio wave of the first network, to the terminal apparatus, a second notification for instructing to perform communication by setting a guard band for the frequency band used in the first network.

22 Claims, 8 Drawing Sheets

(56) References Cited

U.S. PATENT DOCUMENTS

| | | | |
|---|---|---|---|
| 2013/0005240 A1* | 1/2013 | Novak | H04B 7/26 455/11.1 |
| 2015/0312011 A1* | 10/2015 | Abdoli | H04L 27/2603 370/330 |
| 2017/0295497 A1* | 10/2017 | MacMullan | H04W 16/14 |
| 2018/0167892 A1* | 6/2018 | Lee | H04W 52/42 |
| 2019/0215726 A1* | 7/2019 | Park | H04W 16/18 |
| 2020/0008087 A1 | 1/2020 | Papaleo | |
| 2021/0251025 A1 | 8/2021 | Yukimasa | |
| 2022/0086029 A1* | 3/2022 | Abotabl | H04L 27/2605 |
| 2024/0049252 A1* | 2/2024 | Gulati | H04W 72/40 |

\* cited by examiner

| TIME SLOT NUMBER | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| CARRIER NETWORK TDD PATTERN | D | D | D | S | U | U | D | D | D | D | D | D | D | S | U | U | D | D | D | D |
| LOCAL NETWORK TDD PATTERN | D | D | D | S | U | U | D | S | U | U | D | D | D | S | U | U | D | S | U | U |

RADIO FRAME

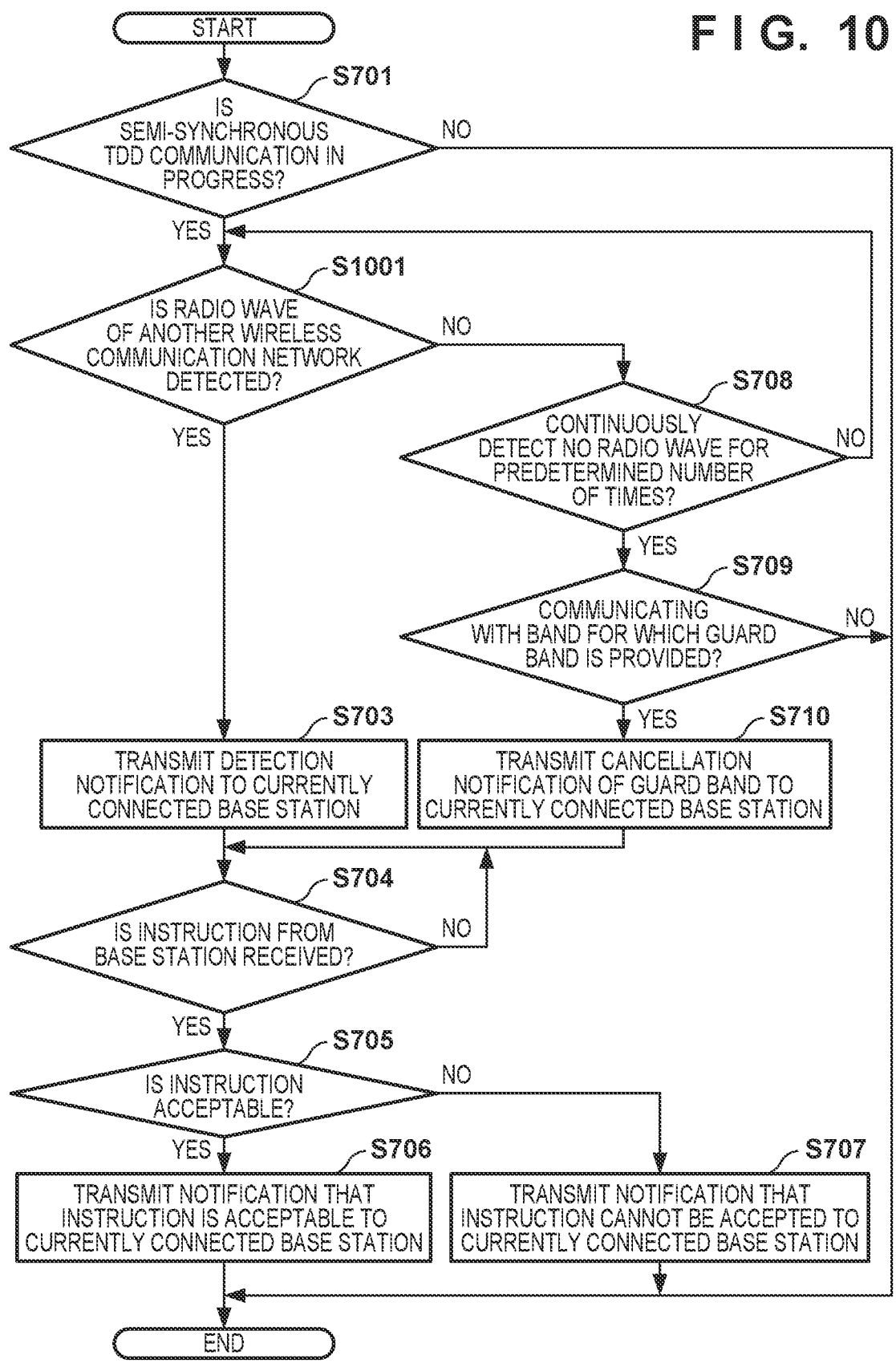

BASE STATION APPARATUS, TERMINAL APPARATUS, CONTROL METHOD, AND STORAGE MEDIUM

BACKGROUND OF THE INVENTION

Field of the Invention

The present invention relates to an interference suppression technique in wireless communication.

Description of the Related Art

A 5th generation (5G) cellular communication standard defined by the 3rd Generation Partnership Project (3GPP) has been put into practice. In 5G, it is possible to use local 5G that can deploy a network mainly by a region or a company other than a communications carrier in addition to a network deployed nationwide by a communications carrier. As a network that can be deployed mainly by a region or a company other than a communications carrier, there is also known regional Broadband Wireless Access (BWA). A network deployed nationwide by a communications carrier will sometimes be referred to as a carrier network hereinafter, and a network of regional BWA or local 5G will sometimes be referred to as a local network hereinafter.

In an environment where different networks like a carrier network and a local network coexist, it is important to suppress interference between communications. Especially, for communication of a network such as a carrier network which should be prioritized, it is necessary to suppress interference by communication of a network such as a local network having relatively low priority.

SUMMARY OF THE INVENTION

The present invention provides an interference suppression technique between networks.

According to one aspect of the present invention, there is provided a base station apparatus of a second network in which communication is performed using time division duplex (TDD) in a frequency band different from a frequency band of a predetermined first network, comprising: one or more processors; and one or more memories that store a computer-readable instruction for causing, when executed by the one or more processors, the one or more processors to receive, from a terminal apparatus currently connected to the base station apparatus, a first notification indicating whether the terminal apparatus has detected a radio wave of a network different from the second network, and transmit, if it is specified based on the first notification that the terminal apparatus has detected a radio wave of the first network, to the terminal apparatus, a second notification for instructing to perform communication by setting a guard band for the frequency band used in the first network.

According to another aspect of the present invention, there is provided a terminal apparatus of a second network in which communication is performed using time division duplex (TDD) in a frequency band different from a frequency band of a predetermined first network, comprising: one or more processors; and one or more memories that store a computer-readable instruction for causing, when executed by the one or more processors, the one or more processors to detect a radio wave from another network different from the second network, transmit a first notification indicating a result of the detection to a base station apparatus currently connected to the terminal apparatus, receive, from the base station apparatus, a second notification that is based on the first notification and instructs to perform communication by setting a guard band for the frequency band used in the first network, and set, based on the second notification, the guard band for the frequency band used in the first network.

Further features of the present invention will become apparent from the following description of exemplary embodiments (with reference to the attached drawings).

BRIEF DESCRIPTION OF THE DRAWINGS

FIG. 10 is a flowchart illustrating an example of the procedure of processing executed by the terminal apparatus.

DESCRIPTION OF THE EMBODIMENTS

Figure 1:
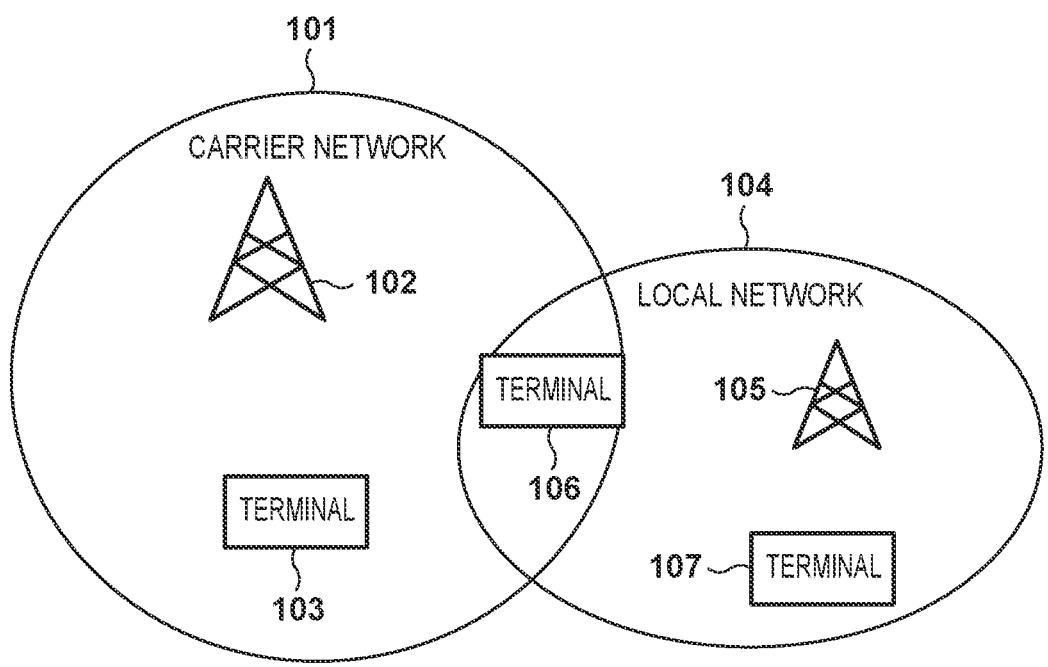
FIG. 1 is a view showing an example of the configuration of a system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Configuration of System)

FIG. 1 shows an example of the configuration of a system according to an embodiment. The system according to this embodiment is formed by including a plurality of networks. In this example, the plurality of networks are cellular communication networks complying with the 3GPP (3rd Generation Partnership Project) cellular communication standard. The first network is a carrier network 101 provided nationwide by a wireless communications carrier, and the second network is a local network 104 locally provided by a region or a company. In an example, the local network 104 is formed within an area where the carrier network 101 is deployed. That is, in an area within and overlapping the area where the carrier network 101 is deployed, the local network 104 is deployed. Note that these are merely examples, and the following discussion is applicable to wireless communication networks of other forms.

In the carrier network 101, in an area where wireless communication can be executed with a base station apparatus 102 to provide a communication service of the carrier network 101, the wireless communication service can be provided to a terminal apparatus 103 of a user who has contracted with the wireless communications carrier. Similarly, in the local network 104, in an area where wireless communication can be executed with a base station apparatus 105 of the local network 104, a wireless communication service is provided to terminal apparatuses 106 and 107 prepared for communication in the local network. In this embodiment, it is assumed that the carrier network 101 is a network which should be prioritized, and in the local network 104, communication is performed by executing processing so as not to interfere with communication in the carrier network 101 or so as to interfere with communication in the carrier network 101 at a sufficiently low level.

It is considered that communication is performed in the carrier network 101 and the local network 104 at individual timings. In this case, even if in the carrier network 101 and the local network 104, communication is performed using Orthogonal Frequency Division Multiplexing (OFDM) that can secure orthogonality, orthogonality is not secured due to a mismatch between the timings of radio frames, and thus the networks may interfere with each other. This interference can be suppressed by matching the timings of the radio frames with each other by, for example, the base station apparatus 105 transmitting/receiving the radio frame in synchronism with the base station apparatus 102 of the carrier network 101.

Note that there are a plurality of patterns for situations in which the networks interfere with each other. For example, as interference from the carrier network 101 to the local network 104, there may be (1) interference from the base station apparatus 102 to the base station apparatus 105 and (2) interference from the base station apparatus 102 to the terminal apparatus 106 or 107. As interference from the carrier network 101 to the local network 104, there may be patterns such as (3) interference from the terminal apparatus 103 to the base station apparatus 105 and (4) interference from the terminal apparatus 103 to the terminal apparatus 106 or 107. As interference from the local network 104 to the carrier network 101, there may be (5) interference from the base station apparatus 105 to the base station apparatus 102 and (6) interference from the base station apparatus 105 to the terminal apparatus 103. As interference from the local network 104 to the carrier network 101, there may be (7) interference from the terminal apparatus 106 or 107 to the base station apparatus 102 and (8) interference from the terminal apparatus 106 or 107 to the terminal apparatus 103. At this time, by assuming that the local network 104 has priority lower than that of the carrier network 101, the interference of each of (1) to (4) is allowed to some extent, and the local network 104 can perform processing of reducing the influence of the interference. On the other hand, the interference of each of (5) to (8) is interference with the prioritized network, and thus the local network 104 needs to prevent such interference from occurring or sufficiently suppress such interference.

In an example, the interference of (5) can be sufficiently suppressed by the base station apparatus 105 of the local network 104 transmitting a signal at a timing when the base station apparatus 102 of the carrier network 101 transmits a signal. Furthermore, the interference of each of (6) and (7) can be suppressed sufficiently small by making the frequency band of a signal transmitted/received by the base station apparatus 102 of the carrier network 101 different from the frequency band of a signal transmitted/received by the base station apparatus 105 of the local network 104. Furthermore, the interference of (8) can also be sufficiently suppressed by the terminal apparatuses 106 and 107 of the local network 104 transmitting signals at a timing when the terminal apparatus 103 of the carrier network 101 transmits a signal.

On the other hand, in the recent cellular communication standard, a TDD (Time Division Duplex) system that can flexibly change the ratio between a downlink in which a signal is transmitted from a base station apparatus to a terminal apparatus and an uplink in which a signal is transmitted from a terminal apparatus to a base station apparatus is standardized. Since the demand for downlink communication is generally high, the carrier network 101 tends to assign more time slots to the downlink. On the other hand, it can be assumed that the local network 104 needs more time slots for the uplink, as compared with the carrier network 101, in accordance with the application purpose of the local network 104. In this case, the local network 104 can assign time slots to the uplink and the downlink independently of assignment of time slots to the uplink and the downlink in the carrier network 101 (see US-2020-0008087). However, in this case, the interference of each of (5) and (8) occurs.

To the contrary, in the local network 104, it is possible to use assignment of time slots in the carrier network 101 by changing part of it. In an example, it is possible to make a setting to assign, to the downlink, only some of slots assigned to the uplink in the carrier network 101 and use, for the downlink, the slots assigned to the downlink in the carrier network 101. It is also possible to make a setting to assign, to the uplink, only some of the slots assigned to the downlink in the carrier network 101 and use, for the uplink, the slots assigned to the uplink in the carrier network 101 as is. According to the former setting, while downlink communication is performed in the carrier network 101, the terminal apparatus 106 or 107 does not transmit a signal, thereby making it possible to suppress the interference of (8). On the other hand, according to the latter setting, while uplink communication is performed in the carrier network 101, the base station apparatus 105 does not transmit a signal, thereby making it possible to suppress the interference of (5).

Figures 2, 3:
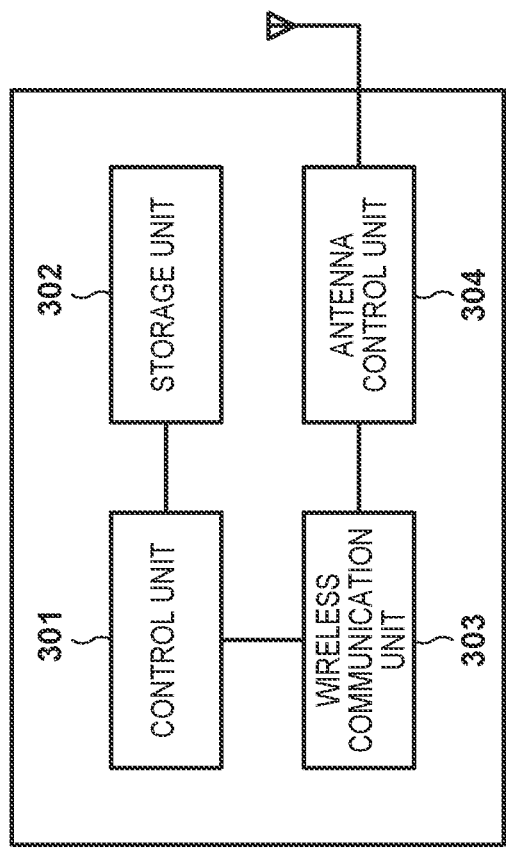
FIG. 2 is a view for explaining an example of the structure of TDD time slots in a carrier network and a local network.
FIG. 3 is a block diagram showing an example of the hardware arrangement of a base station apparatus and a terminal apparatus.

In terms of protection of the base station apparatus 102 of the carrier network 101, a case in which a setting that does not cause the interference of (5) is used will now be examined. 2 shows an example of the setting of time slots in this case. In FIG. 2, "U" indicates a time slot assigned to uplink communication, "D" indicates a time slot assigned to downlink communication, and "S" indicates a time slot representing a period of switching from the downlink to the uplink. Note that communication for which time slots of the local network 104 are assigned by changing the direction (uplink or downlink) of communication in some of the time slots assigned in the carrier network 101 can be called semi-synchronous TDD communication (see US-2020-0008087), In this embodiment, more particularly, as shown in FIG. 2, communication in which a TDD pattern obtained by assigning, to the uplink, time slots assigned to the downlink among the time slots of the carrier network 101 is used in the local network 104 will be referred to as semi-synchronous TDD hereinafter.

In the pattern (to be referred to as the "TDD pattern" hereinafter) of the TDD time slots in the carrier network 101 shown in FIG. 2, among 20 time slots (subframes), four time slots (time slot numbers: 4, 5, 14, and 15) are assigned to uplink communication. Then, in the TDD pattern of the carrier network 101, among the remaining 16 time slots, 14 time slots other than two time slots for switching from downlink communication to uplink communication are assigned to downlink communication. On the other hand, in the TDD pattern of the local network 104, some (time slot numbers: 8, 9, 18, and 19) of the time slots assigned to the downlink in the TDD pattern of the carrier network 101 are assigned to uplink communication. Note that in the TDD pattern of the local network 104, the time slots assigned to uplink communication in the carrier network 101 are all used for uplink communication. The use of such a TDD pattern increases the speed of uplink communication in the local network 104, and it is also possible to reduce the delay of uplink communication and improve the reliability, for example.

By preventing downlink communication from being performed in the local network 104 at a timing when uplink communication is performed in the carrier network 101, when the base station apparatus 102 of the carrier network 101 receives a signal, the base station apparatus 105 of the local network 104 sends no signal. Thus, it is possible to prevent the base station apparatus 105 of the local network 104 from interfering with the signal received by the base station apparatus 102 of the carrier network 101. Note that signals sent from the terminal apparatuses 106 and 107 of the local network 104 may interfere with the signal received by the base station apparatus 102 of the carrier network 101 but the power of these signals are much smaller than that of the signal sent from the base station apparatus 105 of the local network 104. The power of the signals from the terminal apparatuses 106 and 107 of the local network 104 can be made sufficiently small under the control of the base station apparatus 105 of the local network 104. Therefore, it is possible to sufficiently suppress interference with the base station apparatus 102 of the carrier network 101 by the signals sent from the terminal apparatuses 106 and 107 of the local network 104.

On the other hand, due to the time slots assigned to downlink communication in the TDD pattern of the carrier network 101 being assigned to uplink communication in the local network 104, interference with a signal received by the terminal apparatus 103 of the carrier network 101 occurs. This interference is caused by a signal transmitted by the terminal apparatus 106 or 107. In this case, since the distance between the terminal apparatus 103 and the terminal apparatus 106 or 107 is short, even if the transmission power of the signal of the terminal apparatus 106 or 107 is small, the signal may strongly interfere with the reception signal of the terminal apparatus 103. In an example, the interference can be suppressed by using different frequency bands in the carrier network 101 and the local network 104. In this case, however, the distance between the terminal apparatuses is too short, and the influence of the interference by out-of-band radiation may thus not be negligible.

In consideration of the above problem, this embodiment provides a technique of suppressing interference with the terminal apparatus 103 of the carrier network 101 by the terminal apparatus 106 or 107 of the local network 104. Note that in the following description, it is assumed that the carrier network 101 and the local network 104 use adjacent frequency bands. The "adjacent frequency bands" can be, for example, two frequency bands obtained by dividing the frequency band assigned to 5G communication. Note that this is merely an example, and the carrier network 101 and the local network 104 may use frequency bands that partially overlap each other, or frequency bands that are not adjacent to each other and where interference may occur due to out-of-band radiation. In an example, the carrier network 101 can use the 4.5-GHz frequency band and the local network 104 can use the 4.6-GHz frequency band. The above-described example has explained a case in which TDD is used but frequency division duplex (FDD) may be used.

In this embodiment, if a situation is detected in which the terminal apparatus 106 or 107 of the local network 104 can interfere with the terminal apparatus 103 of the carrier network 101, a guard band for suppressing interference with communication of the terminal apparatus 103 is set. For example, if the base station apparatus 105 or the terminal apparatus 106 or 107 of the local network 104 detects a signal of the carrier network 101, a guard band is set for the frequency band used by the carrier network 101. That is, a setting is made not to use some frequency bands (for example, one or more subcarriers) close to the frequency band used by the carrier network 101 among frequency bands usable by the local network 104. On the other hand, if the base station apparatus 105 or the terminal apparatus 106 or 107 of the local network 104 detects no signal of the carrier network 101, communication is performed without setting the guard band. Note that this control processing can be executed for each terminal apparatus. That is, the guard band may be set in communication of some terminal apparatuses, and no guard band may be set in communication of the other terminal apparatuses. For example, a terminal apparatus existing at a position where it may strongly interfere with communication of the carrier network 101 can perform communication by setting the guard band, and a terminal apparatus existing at a position where it is assumed to hardly interfere with communication of the carrier network 101 can perform communication without setting the guard band.

Examples of the arrangement of the base station apparatus 105 and the terminal apparatuses 106 and 107 of the local network 104 that execute the above processing and the procedure of the processing will be described below. Note that the base station apparatus 105 of the local network 104 will be referred to as a "base station apparatus" hereinafter and the terminal apparatuses 106 and 107 of the local network 104 will be referred to as "terminal apparatuses" hereinafter unless otherwise specified.

(Arrangements of Apparatuses)

FIG. 3 shows an example of the hardware arrangement of the base station apparatus and the terminal apparatus according to this embodiment. Each of the base station apparatus and the terminal apparatus includes, as its hardware arrangement, a, control unit 301, a storage unit 302, a wireless communication unit 303, and an antenna control unit 304, for example.

The control unit 301 is formed by including, for example, one or more processors such as a CPU (Central Processing Unit) and an MPU (Micro Processing Unit). Note that the control unit 301 may be formed by including a digital signal processor (DSP), a field programmable gate array (FPGA), and an application-specific integrated circuit (ASIC). The storage unit 302 stores a control program to be executed by the control unit 301, control parameters, a TDD pattern to be used, and various kinds of information such as connected terminal apparatus information. The control unit 301 controls the overall apparatus by executing, for example, the control program stored in the storage unit 302. In an example, various operations (to be described later) are implemented when the control unit 301 executes the control program stored in the storage unit 302.

The wireless communication unit 303 is formed by including a circuit for performing communication complying with the 3GPP cellular communication standard such as 5th generation (5G) New Radio (NR) or Long Term Evolution (LTE) complying with the 3GPP standard. The wireless communication unit 303 is formed by including, for example, a baseband chip or an RF (Radio Frequency) chip. The antenna control unit 304 controls an antenna for wireless communication by the wireless communication unit 303. Note that the antenna control unit 304 may be included in the wireless communication unit 303 or may be provided separately from the wireless communication unit 303. Note that the antenna controlled by the antenna control unit 304 can be, for example, an antenna that can operate in both the frequency bands usable by the carrier network 101 and the local network 104. However, this is merely an example, and the antenna may be, for example, an antenna that can operate only in the frequency band of the local network 104 or an antenna that can also operate in another frequency band.

Figure 4:
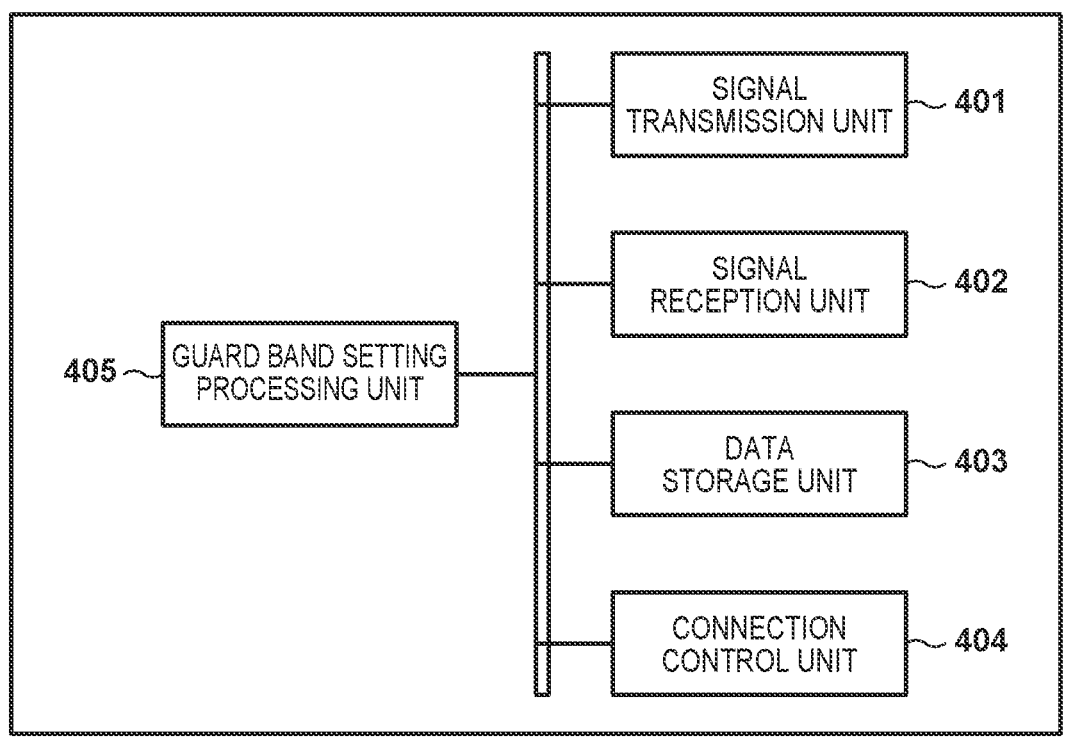
FIG. 4 is a block diagram showing an example of the functional arrangement of the base station apparatus.

FIG. 4 is a block diagram showing an example of the functional arrangement of the base station apparatus according to this embodiment. The base station apparatus includes, as an example of its functional arrangement, a signal transmission unit 401, a signal reception unit 402, a data storage unit 403, a connection control unit 404, and a guard band setting processing unit 405. The signal transmission unit 401 and the signal reception unit 402 transmit and receive a signal having a frame structure defined in the 3GPP cellular communication standard. The data storage unit 403 stores software corresponding to control to be executed, information concerning cellular communication, and the like. The connection control unit 404 executes processing concerning connection and disconnection of the terminal apparatus to and from the cellular network, such as communication of a radio resource control (RRC) message with the terminal apparatus. Furthermore, the connection control unit 404 can execute processing concerning connection with a core network function. The guard band setting processing unit 405 receives, from the terminal apparatus, a notification indicating whether the terminal apparatus has detected the radio wave of another network such as the carrier network 101, and specifies whether the radio wave of the carrier network 101 has been detected. Then, the guard band setting processing unit 405 performs processing concerning guard hand setting (to be described later) based on the result of the specification.

Figure 5:
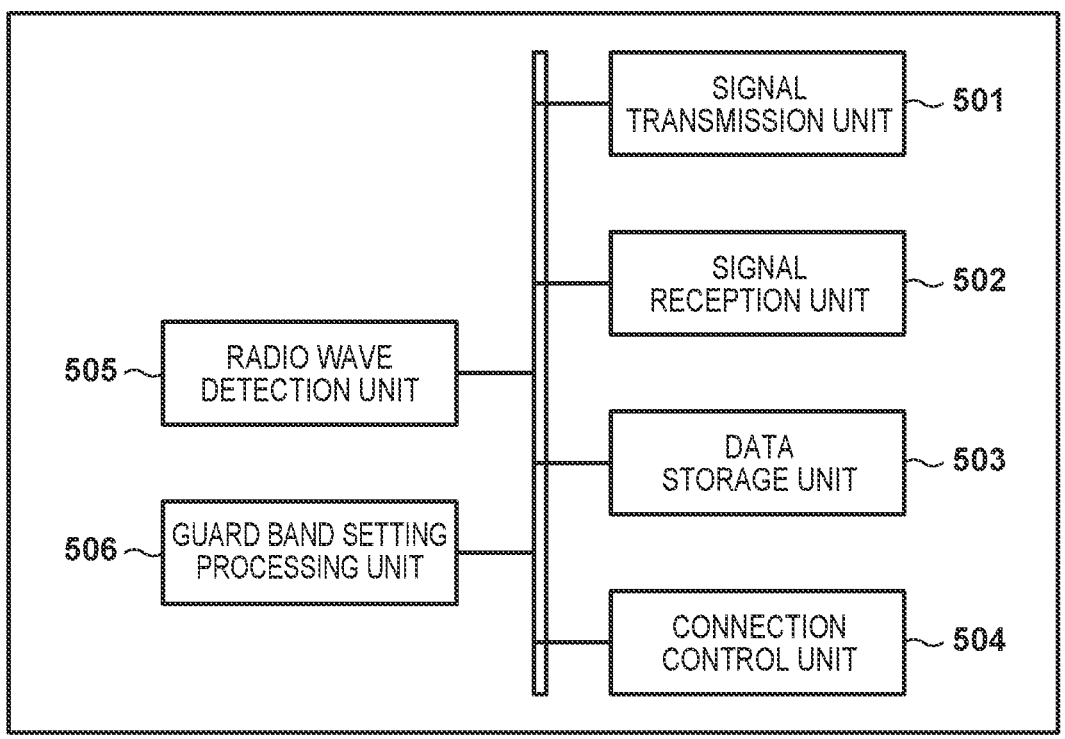
FIG. 5 is a block diagram showing an example of the functional arrangement of the terminal apparatus.

FIG. 5 is a block diagram showing an example of the functional arrangement of the terminal apparatus according to this embodiment. The terminal apparatus includes, as an example of its functional arrangement, a signal transmission unit 501, a signal reception unit 502, a data storage unit 503, a connection control unit 504, a radio wave detection unit 505, and a guard band setting processing unit 506. The signal transmission unit 501 and the signal reception unit 502 transmit and receive a signal having a frame structure defined in the 3GPP cellular communication standard. The data storage unit 503 stores software corresponding to control to be executed, information concerning cellular communication, and the like. The connection control unit 504 executes processing concerning connection and disconnection of the terminal apparatus to and from the cellular network, such as communication of an RRC message with the terminal apparatus. The radio wave detection unit 505 detects a signal transmitted from another base station apparatus different from the base station apparatus in communication with the terminal apparatus. For example, the radio wave detection unit 505 receives a notification signal, and confirms information such as the cell ID or PLMN-ID (Public Land Mobile Networks-IDentifier) of the notification signal. Note that the cell ID is, for example, a physical cell identifier. Then, the radio wave detection unit 505 may determine, based on the confirmed information, whether the notification signal is a signal transmitted by the base station apparatus in communication with the terminal apparatus, thereby specifying whether a signal has been received from another base station apparatus different from the base station apparatus in communication with the terminal apparatus. Note that the radio wave detection unit 505 may detect not only a signal from another base station apparatus but also a signal transmitted by another terminal apparatus other than the self-apparatus. The guard band setting processing unit 506 performs processing concerning guard band setting (to be described later).

(Procedures of Processes)

Figure 6:
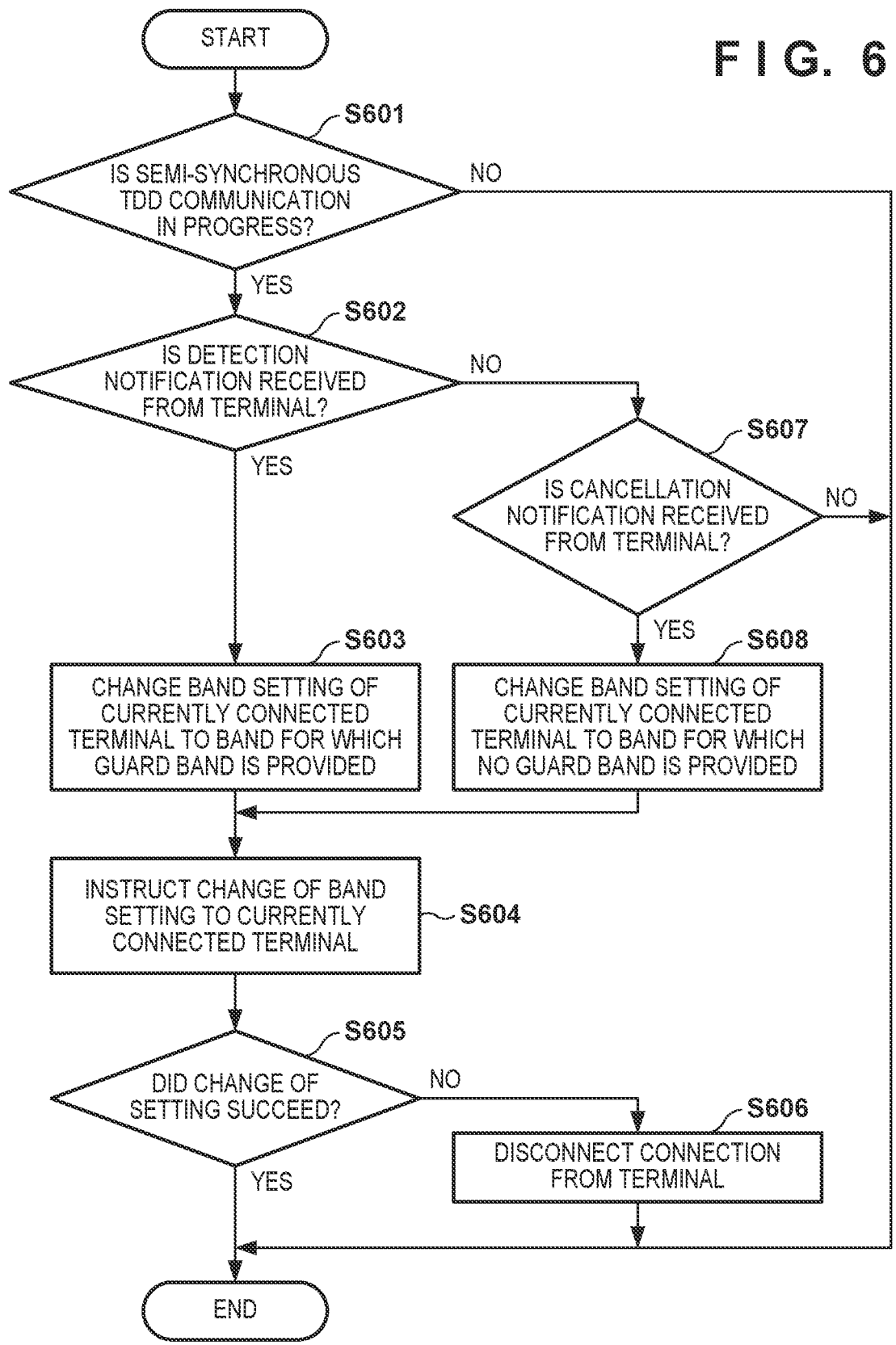
FIG. 6 is a flowchart illustrating an example of the procedure of processing executed by the base station apparatus.

An example of the procedure of processing executed by the base station apparatus 105 of the local network 104 will be described with reference to FIG. 6. Note that a case in which whether to set the guard band is controlled for the terminal apparatus 106 will be described below. However, this is merely an example and, for example, the same control can be executed for an arbitrary terminal apparatus such as the terminal apparatus 107 existing under the base station apparatus 105. For example, this processing starts when the base station apparatus 105 of the local network 104 can communicate with the terminal apparatus. In this processing, the base station apparatus 105 receives, from the terminal apparatus 106, a notification indicating that the carder network 101 has been detected or a cancellation notification of the guard band setting. Then, based on the received information, the base station apparatus 105 instructs the terminal apparatus 106 to set the guard band in uplink communication of the terminal apparatus 106 or to cancel the setting. Note that this processing can be implemented when, for example, the control unit 301 of the base station apparatus 105 reads out a computer program stored in the storage unit 302 and executes it, Note that a dedicated hardware circuit for implementing the following processing may be included in the base station apparatus 105 or, for example, the wireless communication unit 303 may be configured to execute the following processing. Note that the processing shown in FIG. 6 is repeatedly executed while the base station apparatus 105 operates. In an example, when it is explained that the processing ends, the process may be made to shift to determination processing in step S601 or S602.

After the start of the processing, the base station apparatus 105 of the local network 104 determines whether semi-synchronous TDD communication using the frame structure shown in FIG. 2 is being performed in a cell provided by the self-apparatus (S601). If no semi-synchronous TDD communication is not being performed (NO in step S601), the base station apparatus 105 directly ends the processing. Note that in addition to semi-synchronous TDD communication, synchronous TDD communication in which assignment of the time slots to uplink communication and downlink communication is the same can be performed in the local network 104. If synchronous TDD communication is used, a signal transmitted from the terminal apparatus 106 or 107 of the local network 104 does not interfere with the reception signal of the terminal apparatus 103 of the carrier network 101, In this case, therefore, it is unnecessary to execute processing concerning guard band setting. Thus, if synchronous TDD communication is performed, the processing shown in FIG. 6 can directly end.

If semi-synchronous TDD communication is being performed (YES in step S601), the base station apparatus 105 determines whether it receives, from the terminal apparatus 106, a detection notification indicating that a signal of the carrier network 101 has been detected (S602). In this example, it is assumed that the signal of the carrier network 101 is detected by the terminal apparatus 106, but the present invention is not limited to this. For example, the terminal apparatus 106 can detect a signal of an arbitrary network prioritized over the local network 104, with which a signal transmitted from the terminal apparatus 106 can interfere.

If the base station apparatus 105 receives the detection notification from the terminal apparatus 106 (YES in step S602), it decides to use the guard band in communication with the currently connected terminal apparatuses (the terminal apparatuses 106 and 107). That is, the base station apparatus 105 changes the setting of the band to be used in communication with the currently connected terminal apparatuses to the band for which the guard band is provided (S603). On the other hand, if the base station apparatus 105 receives no detection notification from the terminal apparatus 106 (NO in step S602), it is determined whether a cancellation notification of the use of the guard band is received from the terminal apparatus 106 (S607). If the base station apparatus 105 does not receive the cancellation notification from the terminal apparatus 106 (NO in step S607), the processing ends. If the base station apparatus 105 receives the cancellation notification from the terminal apparatus 106 (YES in step S607), it changes the setting of the band to be used in communication with the currently connected terminal apparatuses from the band for which the guard band is provided to the band for which no guard band is provided (S608).

Then, if the band setting is changed in step S603 or S608, the base station apparatus 105 transmits, to the currently connected terminal apparatuses (the terminal apparatuses 106 and 107), a message to instruct a change of the band setting (S604). Note that in steps S603 and S608, the base station apparatus 105 may change only the band setting of the terminal apparatus (for example, the terminal apparatus 106) as the transmission source of the detection notification or cancellation notification. That is, the base station apparatus 105 need not change the band setting of the terminal apparatus for example, the terminal apparatus 107) which is not the transmission source of the notification.

If the change of the setting succeeds (YES in step S605), the base station apparatus 105 ends the processing. On the other hand, if the change of the setting fails (NO in step S605), the base station apparatus 105 disconnects the connection from the terminal apparatus (for example, the terminal apparatus 106) as the transmission source of the detection notification or cancellation notification (S606), and ends the processing. Note that in this case, the base station apparatus 105 can maintain the connection to the terminal apparatus (for example, the terminal apparatus 107) which is not the transmission source of the detection notification or cancellation notification. For example, the base station apparatus 105 may control not to perform uplink communication of the terminal apparatus 106 in a time slot in which downlink communication is performed in the carrier network 101, thereby maintaining communication with the terminal apparatus 106. Note that in this case, the base station apparatus 105 may control to perform uplink communication of the terminal apparatus 107 in a time slot in which downlink communication is performed in the carrier network 101.

Figure 7:
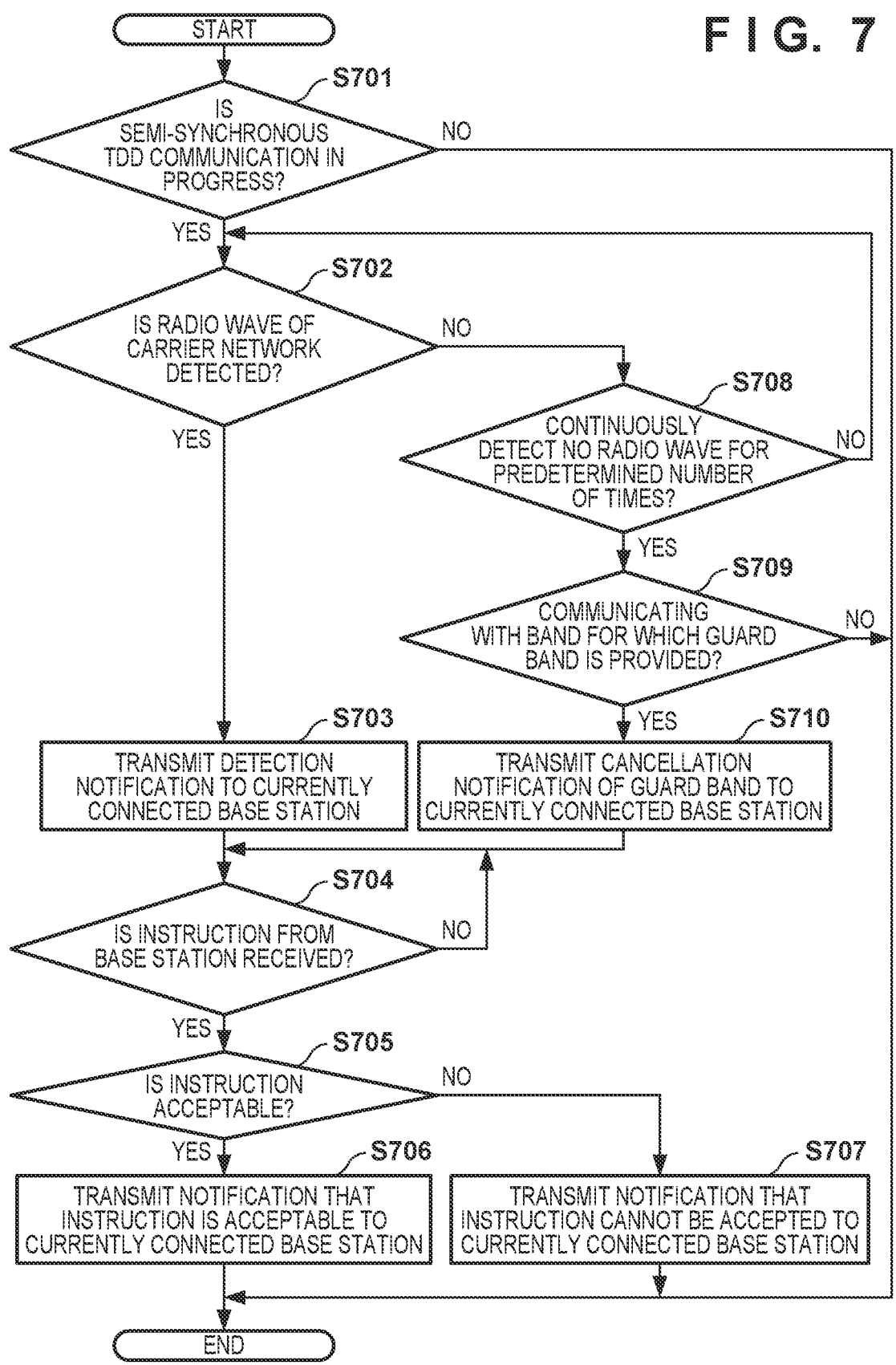
FIG. 7 is a flowchart illustrating an example of the procedure of processing executed by the terminal apparatus.

Subsequently, an example of the procedure of processing executed by the terminal apparatus 106 or 107 of the local network 104 will be described with reference to FIG. 7. This processing starts when, for example, the terminal apparatus 106 or 107 establishes connection to the base station apparatus 105. For example, this processing may start when the terminal apparatus 106 or 107 receives a predetermined instruction from the base station apparatus 105. In this processing, the terminal apparatus 106 or 107 executes detection processing of the carrier network 101, and transmits, to the base station apparatus 105, a notification corresponding to the result of the detection processing. Then, the terminal apparatus 106 or 107 receives an instruction to set the guard band in uplink communication or cancel the setting, which is decided by the base station apparatus 105 based on the notification, and executes communication control based on the instruction. Note that this processing can be implemented when, for example, the control unit 301 of the terminal apparatus 106 or 107 reads out a computer program stored in the storage unit 302 and executes it. Note that a dedicated hardware circuit for implementing the following processing may be included in the terminal apparatus 106 or 107 or, for example, the wireless communication unit 303 may be configured to execute the following processing. Note that the processing shown in FIG. 7 may be repeatedly executed while the terminal apparatus 106 or 107 establishes connection to the base station apparatus 105. In an example, when it is explained below that the processing ends, the process may be made to shift to determination processing in step S701 or S702, Note that the terminal apparatuses 106 and 107 will be referred to as "terminal apparatuses" hereinafter.

After the start of the processing, the terminal apparatus determines whether semi-synchronous TDD communication using the frame structure shown in FIG. 2 is being performed with the base station apparatus 105 (S701). If no semi-synchronous TDD communication is being performed (NO in step S701), the terminal apparatus directly ends the processing. If semi-synchronous TDD communication is being performed (YES in step S701), the terminal apparatus executes detection processing of the radio wave of the carrier network 101 (S702), For example, the terminal apparatus executes reception processing of the radio wave in a frequency band used for communication of the carrier network 101, and determines based on the cell ID or PLMN-ID of the received signal whether the radio wave of the carrier network 101 has arrived, as described above. The terminal apparatus may determine whether a peripheral terminal apparatus transmits a signal in the frequency band of the carrier network 101. Note that the detection processing can be executed for, for example, a predetermined period (for example, one or more frames). The detection processing can be performed in, for example, a time slot in which uplink communication is performed in the carrier network 101. According to this, the terminal apparatus can determine whether the terminal apparatus 103 of the carrier network 101 exists on the periphery. Furthermore, the detection processing may be performed in a time slot in which downlink communication is performed in the carrier network 101. According to this, the terminal apparatus can determine whether the self-apparatus exists at a position where downlink communication can be performed in the carrier network 101. For example, the terminal apparatus may detect the radio wave of another local network in addition to or instead of the radio wave of the carrier network 101. Note that the detection processing may be executed by the control unit 301 or the wireless communication unit 303. Alternatively, another functional unit different from the control unit 301 and the wireless communication unit 303 may perform the detection processing of the radio wave.

If the radio wave of the carrier network 101 is detected (YES in step S702), the terminal apparatus transmits, to the currently connected base station apparatus 105, a detection notification indicating that the radio wave of the carrier network 101 has been detected (S703), In an example, when the detection notification is transmitted to the base station apparatus 105, the base station apparatus 105 can notify the terminal apparatus of an instruction to perform communication in which the guard band is provided, as described above. If the terminal apparatus receives, from the base station apparatus 105, for example, the instruction to perform communication in which the guard band is provided (YES in step S704), it is determined whether the instruction is acceptable (S705). For example, if the terminal apparatus has no capability of performing communication in which the guard band is provided or the terminal apparatus is set not to perform such communication, it can be determined that the instruction is unacceptable. Furthermore, in a case in which if the terminal apparatus performs communication in which the guard band is provided, it cannot achieve a requested communication capacity, it can be determined that the instruction is unacceptable. Note that these are merely examples, and it may be determined based on another criterion whether the instruction is acceptable, if the terminal apparatus determines that the instruction is acceptable (YES in step S705), it transmits, to the base station apparatus 105, a notification indicating that the instruction is acceptable (S706), This causes the terminal apparatus to change the setting to perform, in uplink communication, communication in which the guard hand is provided, Note that the base station apparatus 105 and the terminal apparatus may perform, in downlink communication as well, communication in which the guard band is provided. On the other hand, if the terminal apparatus determines that the instruction is unacceptable (NO in step S705), it transmits, to the base station apparatus 105, a notification indicating that the instruction cannot be accepted (S707). Note that in this case, the terminal apparatus may continue, under the control of the base station apparatus 105, the communication with the band setting in which no guard band is provided, or execute processing of disconnecting the connection from the base station apparatus 105.

On the other hand, if the terminal apparatus detects no radio wave of the carrier network 101 (NO in step S702), it repeatedly executes the detection processing. Then, if the terminal apparatus continuously detects no radio wave of the carrier network 101 for a predetermined number of times of the detection processing during communication with the band setting in which the guard band is provided (YES in step S708 and YES in step S709), the terminal apparatus transmits a cancellation notification of the guard band setting to the base station apparatus 105 (S710), Note that if the terminal apparatus detects no radio wave of the carrier network 101 for a predetermined time, it may transmit the cancellation notification to the base station apparatus 105. In an example, when the cancellation notification is transmitted to the base station apparatus 105, the base station apparatus 105 can notify the terminal apparatus of an instruction to perform communication in which no guard band is provided, as described above. If the terminal apparatus receives, from the base station apparatus 105, for example, the instruction to perform communication in which no guard band is provided (YES in step S704), the terminal apparatus determines whether the instruction is acceptable (S705). Then, in accordance with the determination result, the terminal apparatus executes processing in step S706 or S707, as described above. As in step S708, by determining that the radio wave of the carrier network 101 cannot be detected in the predetermined number of times of the detection processing or in the detection processing for the predetermined time, it is possible to prevent the guard band from being canceled because the radio wave cannot be detected instantaneously, Note that if the terminal apparatus detects no radio wave of the carrier network 101 during communication with the band setting in which no guard band is provided (NO in step S709), the processing directly ends.

Figure 8:
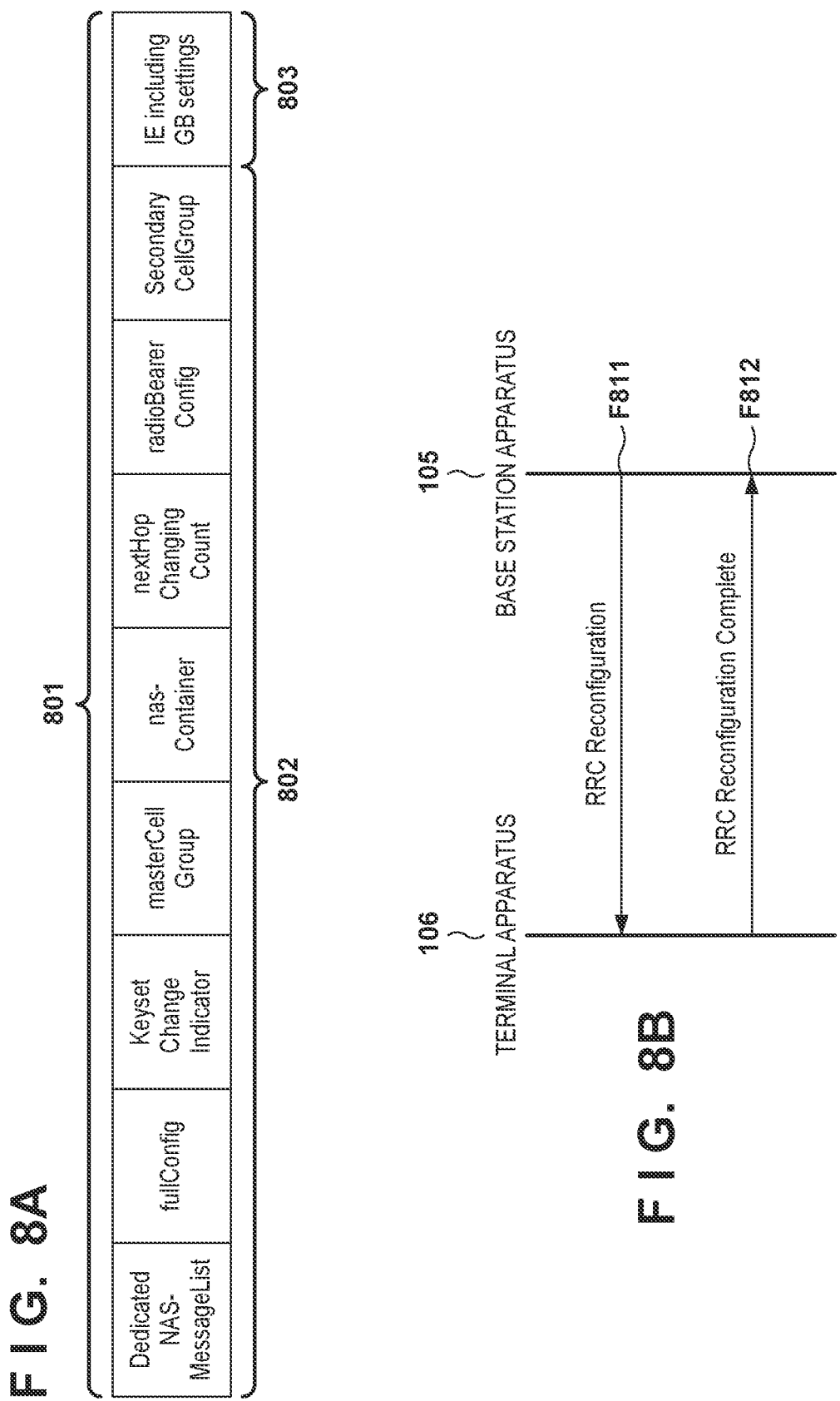
FIG. 8A is a view showing the structure of a message when the base station apparatus causes the terminal apparatus to set a guard band.
FIG. 8B is a sequence chart showing an example of the procedure of control signaling when the base station apparatus causes the terminal apparatus to set the guard hand.

Note that control of the guard band setting and cancellation of the setting by the base station apparatus 105 can be performed using an RRC message (for example, an RRC Reconfiguration message). FIG. 8A shows the structure of the message in this case, and FIG. 8B shows the procedure of transmission/reception of the message between the base station apparatus 105 and the terminal apparatus 106. In this embodiment, for example, in addition to existing information elements (IEs) 802 of an RRC Reconfiguration message 801, the base station apparatus 105 includes an IE 803 including information concerning a guard band setting change. Note that FIG. 8A shows an example in which the IE 803 is included in the end of the RRC Reconfiguration message 801 but the IE 803 may be included at another position. For example, as the processing in step S604, the base station apparatus 105 transmits the RRC Reconfiguration message 801 including the IE 803 to the terminal apparatus 106 (F811), Upon receiving the RRC Reconfiguration message 801, the terminal apparatus 106 determines, in step S705, based on the information included in the IF 803 whether the guard band setting is acceptable. Then, the terminal apparatus 106 transmits, to the base station apparatus 105, an RRC Reconfiguration Complete message including information indicating the determination result (F812). Note that the setting by the RRC message is merely an example, and the guard band may be set by other signals. For example, if the terminal apparatus 106 can always operate in accordance with an instruction from the base station apparatus 105, the base station apparatus 105 may notify the terminal apparatus 106 of the guard band setting using, for example, downlink control information (DCI) for resource assignment of the uplink. Note that the radio wave detection notification may be sent using uplink control information (UCI), or may be multiplexed with user data and sent.

As described above, according to this embodiment, the terminal apparatus 106 of the local network 104 detects the radio wave of the carrier network 101. If the radio wave is detected, the base station apparatus 105 executes control to perform communication by setting the guard band. According to this, it is possible to suppress interference with the terminal apparatus 103 of the carrier network 101, which can exist nearby, caused when the terminal apparatus 106 transmits an uplink signal in a time slot in which downlink communication is performed in the carrier network 101. Furthermore, if the terminal apparatus 106 or 107 detects no radio wave of the carrier network 101, and can determine that communication of the carrier network 101 is not performed on the periphery, the terminal apparatus can perform high-speed large-capacity uplink communication without using the guard band.

Figure 9:
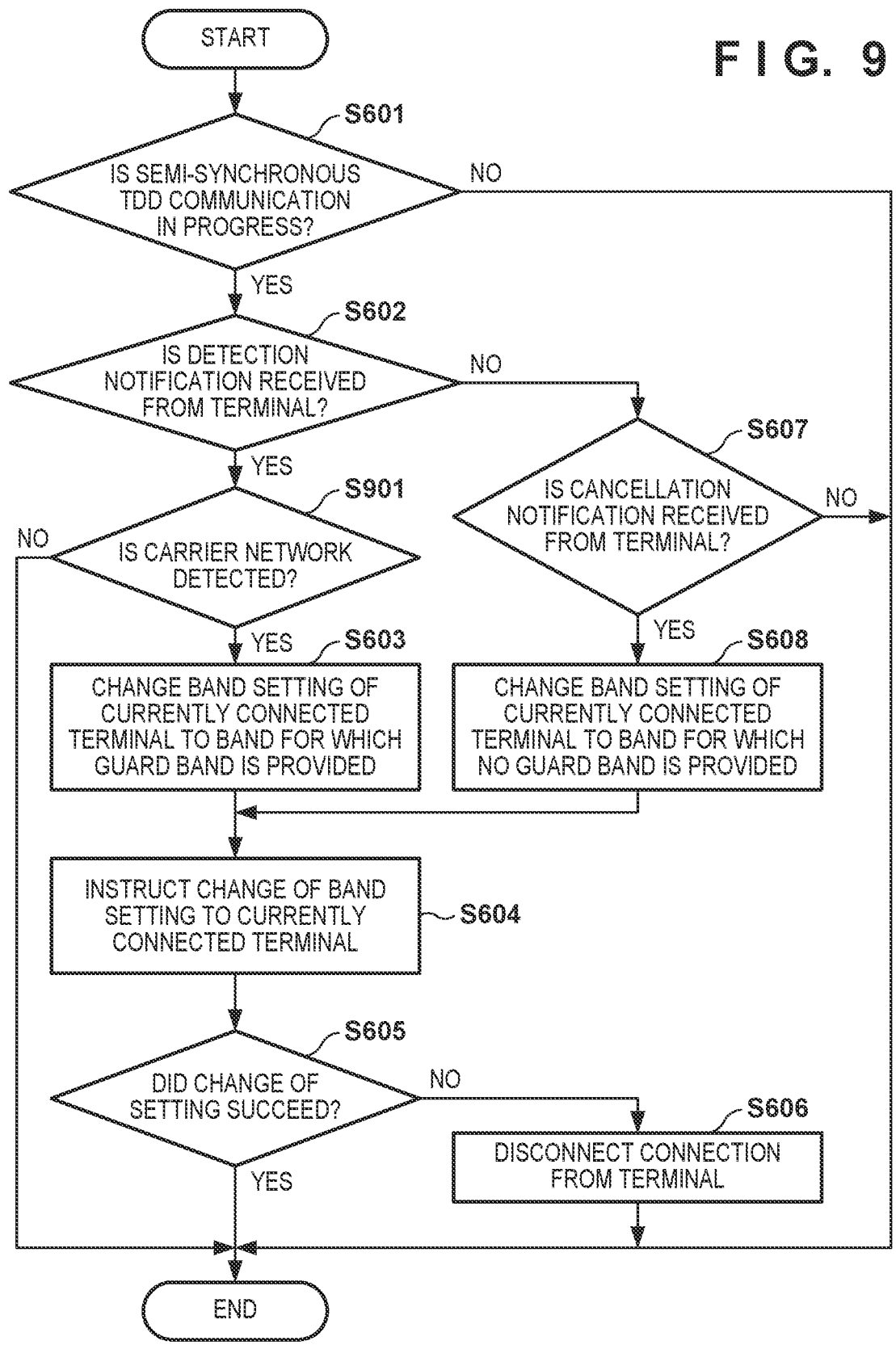
FIG. 9 is a flowchart illustrating an example of the procedure of processing executed by the base station apparatus.

Note that in the above-described example, the terminal apparatus 106 or 107 determines whether the radio wave of the carrier network 101 has been detected. However, this determination may be performed by the base station apparatus 105. That is, the terminal apparatus 106 or 107 may determine only whether the radio wave of another network has been detected, and the base station apparatus 105 may determine whether the detected radio wave is the radio wave of the carrier network 101. FIG. 9 shows an example of the procedure of the processing of the base station apparatus 105 in this case, and FIG. 10 shows an example of the procedure of the processing of each of the terminal apparatuses 106 and 107. Note that the same reference numerals as in FIGS. 6 and 7 denote the same processes and a description thereof will be omitted.

The terminal apparatus 106 or 107 detects the radio wave of another network different from the network to which the self-apparatus belongs without limitation to the carrier network 101 (S1001 of FIG. 10), and transmits a detection notification to the base station apparatus 105. Then, if the base station apparatus 105 receives the detection notification (YES in step S602), it determines whether the detected network is the carrier network 101 (S901). If the detected network is the carrier network 101, the base station apparatus 105 advances the process to step S603; if the detected network is not the carrier network 101, the base station apparatus 105 ends the processing. In an example, the detection notification includes a parameter such as the PLMN-ID or cell ID with respect to the radio wave detected by the terminal apparatus 106 or 107, and the base station apparatus 105 can perform the determination in step S901 based on the parameter. In another example, the detection notification can indicate only that the radio wave from a network other than the network to which the terminal apparatus 106 or 107 belongs has been detected. In this case, the base station apparatus 105 executes radio wave detection processing in itself. If, for example, the radio wave transmitted in the carrier network 101 is detected, the base station apparatus 105 may estimate that the network detected by the terminal apparatus 106 or 107 is the carrier network 101.

Note that referring to FIG. 10, if the radio wave of another network is not detected in the terminal apparatus by the predetermined number of times of the detection processing or the detection processing for a predetermined period, the terminal apparatus transmits a cancellation notification of the guard band. The present invention, however, is not limited to this. For example, even if the terminal apparatus detects the radio wave of another network, if the base station apparatus 105 continuously determines, a predetermined number of times or for a predetermined period, that the detected radio wave is not the radio wave of the carrier network 101, the guard band may be canceled. In this case, even if the terminal apparatus detects the radio wave of another network and does not transmit a cancellation notification of the guard hand, the base station apparatus 105 can determine that the guard band setting is unnecessary, and instruct the terminal apparatus to cancel the guard band. This can prevent the guard band from being set unnecessarily.

This processing can also suppress interference with the terminal apparatus 103 of the carrier network 101, which can exist nearby, caused when the terminal apparatus 106 transmits an uplink signal in a time slot in which downlink communication is performed in the carrier network 101. Furthermore, if the terminal apparatus 106 or 107 detects no radio wave of the carrier network 101, and can determine that communication of the carrier network 101 is not performed on the periphery, the terminal apparatus can perform high-speed large-capacity uplink communication without using the guard band.

Note that the above-described embodiment has explained the technique of suppressing interference with the carrier network 101. However, to suppress interference with a network other than the carrier network 101, the above-described processing may be executed. That is, if the terminal apparatus 106 or 107 detects the radio wave of a predetermined network with which communication of the local network 104 should not interfere, uplink (downlink in some cases) communication in which the guard band is set may be performed. Note that in the processes shown in FIGS. 6 and 7, for example, when connection is established, the base station apparatus 105 may notify the terminal apparatus 106 or 107 of information (for example, the PLMN-ID or cell ID) concerning the network to be detected. In the processes shown in FIGS. 9 and 10, for example, when connection is established, the base station apparatus 105 may notify the terminal apparatus 106 or 107 of information of a parameter (for example, information for designating the PLMN-ID or cell ID) to be notified by the detection notification.

Note that the above-described example has explained the processing for suppressing interference caused when uplink communication is performed in an unprioritized network at a timing when downlink communication is performed in a prioritized network. The present invention, however, is not limited to this. That is, by applying the above-described guard band setting to downlink communication, it is also possible to suppress interference caused when downlink communication is performed in an unprioritized network at a timing when uplink communication is performed in a prioritized network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073656, filed Apr. 23, 2021, which is hereby incorporated by reference herein in its entirety.

What is claimed is:

1. A base station apparatus of a second network in which communication is performed using time division duplex (TDD) in a frequency band different from a frequency band of a predetermined first network, comprising:
one or more processors; and
one or more memories that store a computer-readable instruction for causing, when executed by the one or more processors, the one or more processors to
receive, from each of a first terminal apparatus and a second terminal apparatus both of which are currently connected to the base station apparatus, a first notification indicating whether a radio wave of a network different from the second network has been detected, and
in a case where it is specified based on the first notification that the first terminal apparatus has detected a radio wave of the first network and that the second terminal apparatus has not detected a radio wave of the first network, transmit, to the first terminal apparatus, a second notification for instructing to perform communication by setting a guard band for the frequency band used in the first network, and not transmit the second notification to the second terminal apparatus,
wherein the first network is a cellular communication network that is provided nationwide, and the second network is a cellular communication network that is locally provided.

2. The base station apparatus according to claim 1, wherein the computer-readable instruction further causes, when executed by the one or more processors, the one or more processors to specify, if the first notification indicating that the radio wave of the first network has been detected is received from the first terminal apparatus, that the first terminal apparatus has detected the radio wave of the first network.

3. The base station apparatus according to claim 1, wherein the computer-readable instruction further causes, when executed by the one or more processors, the one or more processors to specify, if the first notification indicating that a radio wave of an other network has been detected is received from the first terminal apparatus, whether the first terminal apparatus has detected the radio wave of the first network, by specifying whether the other network is the first network.

4. The base station apparatus according to claim 1, wherein whether the first terminal apparatus has detected the radio wave of the first network is specified based on one of a cell identifier (cell ID) and a Public Land Mobile Networks-IDentifier (PLMN-ID) included in a signal received by the first terminal apparatus.

5. The base station apparatus according to claim 1, wherein
if first assignment of uplink communication and downlink communication to time slots in the first network matches second assignment of uplink communication and downlink communication to time slots in the second network, the base station apparatus does not transmit the second notification, and
if the first assignment does not match the second assignment and it is specified that the first terminal apparatus has detected the radio wave of the first network, the base station apparatus transmits the second notification.

6. The base station apparatus according to claim 1, wherein if while the first terminal apparatus performs communication by setting the guard band, the base station apparatus receives, from the first terminal apparatus, the first notification indicating that the radio wave of the first network is not detected for a predetermined period in detection processing executed by the first terminal apparatus or that the radio wave of the first network is not detected in a predetermined number of times of the detection processing, the base station apparatus transmits, to the first terminal apparatus, a third notification for instructing to perform communication without setting the guard band.

7. The base station apparatus according to claim 3, wherein if while the first terminal apparatus performs communication by setting the guard band, the base station apparatus receives, from the first terminal apparatus, the first notification indicating that the radio wave of the other network has been detected in detection processing executed by the first terminal apparatus but it is specified, a predetermined number of times or for a predetermined period, that the other network is not the first network, the base station apparatus transmits, to the first terminal apparatus, a third notification for instructing to perform communication without setting the guard band.

8. The base station apparatus according to claim 1, wherein the second notification is a notification for instructing to set the guard band in uplink communication and for not instructing to set the guard band in downlink communication.

9. The base station apparatus according to claim 1, wherein the base station apparatus sends a notification to the first terminal apparatus by a radio resource control (RRC) message.

10. A terminal apparatus of a second network in which communication is performed using time division duplex (TDD) in a frequency band different from a frequency band of a predetermined first network, comprising:
one or more processors; and
one or more memories that store a computer-readable instruction for causing, when executed by the one or more processors, the one or more processors to
detect a radio wave from an other network different from the second network,
transmit a first notification indicating whether the radio wave has been detected to a base station apparatus currently connected to the terminal apparatus,
in a case where the first notification indicates that the radio wave has been detected,
receive, from the base station apparatus, a second notification that instructs to perform communication by setting a guard band for the frequency band used in the first network, and
set, based on the second notification, the guard band for the frequency band used in the first network,
wherein the first network is a cellular communication network that is provided nationwide, and the second network is a cellular communication network that is locally provided, and
wherein in a case where the first notification indicates that the radio wave has not been detected and where an other terminal apparatus belonging to the second network notifies the base station apparatus that the radio wave has detected, the terminal apparatus does not set the guard band and performs communication with the base station apparatus while the other terminal apparatus sets the guard band and performs communication with the base station apparatus.

11. The terminal apparatus according to claim 10, wherein the first notification includes information indicating whether the terminal apparatus has detected a radio wave of the first network.

12. The terminal apparatus according to claim 10, wherein
the first notification includes information indicating whether the terminal apparatus has detected the radio wave of the other network, and
if the first notification is received, the base station apparatus specifies whether the terminal apparatus has detected a radio wave of the first network.

13. The terminal apparatus according to claim 11, wherein whether the terminal apparatus has detected the radio wave of the first network is specified based on one of a cell identifier (cell ID) and a Public Land Mobile Networks-IDentifier (PLMN-ID) included in a signal received by the terminal apparatus.

14. The terminal apparatus according to claim 10, wherein if first assignment of uplink communication and downlink communication to time slots in the first network matches second assignment of uplink communication and downlink communication to time slots in the second network, the terminal apparatus does not perform the detection; if the first assignment does not match the second assignment, the terminal apparatus performs the detection.

15. The terminal apparatus according to claim 10, wherein if while the terminal apparatus sets the guard band, the radio wave of the other network is not detected for a predetermined period in executed detection processing or the radio wave of the other network is not detected in a predetermined number of times of the detection processing, the terminal apparatus transmits, to the base station apparatus, the first notification indicating that the guard band should be canceled.

16. The terminal apparatus according to claim 10, wherein
the second notification is a notification for instructing to set the guard band in uplink communication and for not instructing to set the guard band in downlink communication, and
the terminal apparatus makes the setting based on the instruction indicated by the second notification.

17. The terminal apparatus according to claim 10, wherein if while the terminal apparatus performs communication using the guard band, the terminal apparatus receives a third notification for instructing to perform communication without using the guard band, the terminal apparatus cancels the use of the guard band based on the third notification.

18. The terminal apparatus according to claim 10, wherein the terminal apparatus receives a notification from the base station apparatus by a radio resource control (RRC) message.

19. A control method executed by a base station apparatus of a second network in which communication is performed using time division duplex (TDD) in a frequency band different from a frequency band of a predetermined first network, the method comprising:
receiving, from each of a first terminal apparatus and a second terminal apparatus both of which are currently connected to the base station apparatus, a first notification indicating whether a radio wave of a network different from the second network has been detected; and
in a case where it is specified based on the first notification that the first terminal apparatus has detected a radio wave of the first network and that the second terminal apparatus has not detected a radio wave of the first network, transmit, to the first terminal apparatus, a second notification for instructing to perform communication by setting a guard band for the frequency band used in the first network, and not transmit the second notification to the second terminal apparatus,
wherein the first network is a cellular communication network that is provided nationwide, and the second network is a cellular communication network that is locally provided.

20. A control method executed by a terminal apparatus of a second network in which communication is performed using time division duplex (TDD) in a frequency band different from a frequency band of a predetermined first network, the method comprising:
detecting a radio wave from another network different from the second network;
transmitting a first notification indicating whether the radio wave has been detected to a base station apparatus currently connected to the terminal apparatus;
in a case where the first notification indicates that the radio wave has been detected,
receiving, from the base station apparatus, a second notification that instructs to perform communication by setting a guard band for the frequency band used in the first network; and
setting, based on the second notification, the guard band for the frequency band used in the first network,
wherein the first network is a cellular communication network that is provided nationwide, and the second network is a cellular communication network that is locally provided, and
wherein in a case where the first notification indicates that the radio wave has not been detected and where another terminal apparatus belonging to the second network notifies the base station apparatus that the radio wave has detected, the terminal apparatus does not set the guard band and performs communication with the base station apparatus while the other terminal apparatus sets the guard band and performs communication with the base station apparatus.

21. A non-transitory computer-readable storage medium that stores a computer program for causing, when executed by a computer included in a base station apparatus of a second network in which communication is performed using time division duplex (TDD) in a frequency band different from a frequency band of a predetermined first network, the computer to:
receive, from each of a first terminal apparatus and a second terminal apparatus both of which are currently connected to the base station apparatus, a first notification indicating whether a radio wave of a network different from the second network has been detected; and
in a case where it is specified based on the first notification that the first terminal apparatus has detected a radio wave of the first network and that the second terminal apparatus has not detected a radio wave of the first network, transmit, to the first terminal apparatus, a second notification for instructing to perform communication by setting a guard band for the frequency band used in the first network, and not transmit the second notification to the second terminal apparatus,
wherein the first network is a cellular communication network that is provided nationwide, and the second network is a cellular communication network that is locally provided.

22. A non-transitory computer-readable storage medium that stores a computer program for causing, when executed by a computer included in a terminal apparatus of a second network in which communication is performed using time division duplex (TDD) in a frequency band different from a frequency band of a predetermined first network, the computer to:
 detect a radio wave from another network different from the second network;
 transmit a first notification indicating whether the radio wave has been detected to a base station apparatus currently connected to the terminal apparatus;
 in a case where the first notification indicates that the radio wave has been detected,
  receive, from the base station apparatus, a second notification that instructs to perform communication by setting a guard band for the frequency band used in the first network; and
  set, based on the second notification, the guard band for the frequency band used in the first network,
 wherein the first network is a cellular communication network that is provided nationwide, and the second network is a cellular communication network that is locally provided, and
 wherein in a case where the first notification indicates that the radio wave has not been detected and where an other terminal apparatus belonging to the second network notifies the base station apparatus that the radio wave has detected, the terminal apparatus does not set the guard band and performs communication with the base station apparatus while the other terminal apparatus sets the guard band and performs communication with the base station apparatus.

* * * * *